(12) United States Patent
Cai et al.

(10) Patent No.: US 9,956,834 B2
(45) Date of Patent: May 1, 2018

(54) ASSEMBLY AND DISASSEMBLY DEVICE FOR AUTOMOBILE TIRE

(71) Applicant: SHANGHAI BALANCE AUTOMOTIVE EQUIPMENT CO., LTD, Shanghai (CN)

(72) Inventors: Xilin Cai, Shanghai (CN); Shaojie Feng, Shanghai (CN)

(73) Assignee: SHANGHAI BALANCE AUTOMOTIVE EQUIPMENT CO., LTD, Shanghai (CN)

( * ) Notice: Subject to any disclaimer, the term of this patent is extended or adjusted under 35 U.S.C. 154(b) by 230 days.

(21) Appl. No.: 14/899,035

(22) PCT Filed: Oct. 25, 2013

(86) PCT No.: PCT/CN2013/085959
§ 371 (c)(1),
(2) Date: Dec. 16, 2015

(87) PCT Pub. No.: WO2015/024295
PCT Pub. Date: Feb. 26, 2015

(65) Prior Publication Data
US 2016/0129740 A1 May 12, 2016

(30) Foreign Application Priority Data
Aug. 19, 2013 (CN) .......................... 2013 1 0362344

(51) Int. Cl.
*B60C 25/138* (2006.01)
*B60C 25/05* (2006.01)
(Continued)

(52) U.S. Cl.
CPC ........ *B60C 25/138* (2013.01); *B60C 25/0545* (2013.01); *F16H 1/06* (2013.01); *F16H 1/08* (2013.01)

(58) Field of Classification Search
CPC .............. B60C 25/053; B60C 25/0542; B60C 25/0545; F16H 1/06; F16H 1/08
See application file for complete search history.

(56) References Cited

U.S. PATENT DOCUMENTS

| | | | | |
|---|---|---|---|---|
| 3,238,989 | A | * | 3/1966 | Silvestrani .............. B60B 30/06 157/1.24 |
| 2014/0024486 | A1 | * | 1/2014 | Sotgiu ................. B60C 25/0545 475/149 |
| 2015/0174974 | A1 | * | 6/2015 | Sotgiu ................. B60C 25/0545 475/149 |

FOREIGN PATENT DOCUMENTS

| CN | 2298949 | 12/1998 |
|---|---|---|
| CN | 201442500 | 4/2010 |

(Continued)

OTHER PUBLICATIONS

International Search Report for PCT/CN2013/085959, dated May 20, 2014, and English translation thereof, 4 pages total.

*Primary Examiner* — David B Thomas
(74) *Attorney, Agent, or Firm* — Hamre, Schumann, Mueller & Larson, P.C.

(57) ABSTRACT

The present invention relates to a assembly and disassembly device for automobile tire, comprising a device case (41), an upright (42) disposed on the device case (41), a tire dismantling tool connected to a cross beam of the upright (42), and a workbench (44) disposed below the tire dismantling tool (43) and located in the device case (41). The device case (41) is internally provided with a combined compound gearbox (46); the main shaft (31) of the motor penetrates the case; the lower end of the main shaft (31) in the device case (41) is in an engaged connection with a motor gear (36) disposed in the case. The motor gear (36) brings the main shaft gear (35) sleeved on the upper part of the main shaft (31) through a drive gear to drive the workbench (44) connected with the
(Continued)

main shaft (31) for it to work. Compared with the prior art, the present invention has the advantages of obvious energy-saving effects, reduction of transmission consumption, long service life, etc.

6 Claims, 2 Drawing Sheets

(51) Int. Cl.
  *F16H 1/08* (2006.01)
  *F16H 1/06* (2006.01)

(56) References Cited

FOREIGN PATENT DOCUMENTS

| | | |
|---|---|---|
| CN | 203427555 | 2/2014 |
| JP | 59-53211 | 3/1984 |
| KR | 20020047960 | 6/2002 |
| KR | 20120121132 | 11/2012 |

\* cited by examiner

ASSEMBLY AND DISASSEMBLY DEVICE FOR AUTOMOBILE TIRE

BACKGROUND OF THE INVENTION

Technical Field

The present invention relates to a tire dismantling device, in particular to an assembly and disassembly device for automobile tire.

2. Description of Related Art

At present, devices for dismantling vehicle tires, with structures as shown in FIG. 2, generally comprise a device case 21, an upright 22, a tire dismantling tool 23 and a workbench 44; the workbench 44 consists of two cylinders 25 and claws. The device case 21 is also provided with a gearbox 26 inside. A motor support 27 is needed to support a motor 28 located in the device case 21. The motor 28 and the gearbox 26 are connected through a belt 29. The gearbox 26 has a main shaft connected with the workbench. The working principle is as follows: the motor 28 drives the gearbox 26 through the belt 29, and the gearbox 26 drives the workbench 44 through the main shaft to meet the requirement for dismantling the tires.

The structure of the gearbox used can be seen in FIG. 1. This is the structure of the gearboxes of all tire dismantling devices in the world, all employing worm and gear for reducing drive. The gearbox body consists of an upper cover 2 and a lower cover 3 and the main shaft penetrates the case. The main shaft 1 is connected with a turbine 4 and a worm 5 for drive. However, the turbine 4 and the worm 5 consume about 20% of the power during drive, and then, with the addition of 10% of the power consumed when the belt moves, the actual motor power transmitted to the workbench is about 70%. the torque tester tests that the torsional force of a 220V 0.75 kw motor is about 1,100 N·m, when reaching the workbench, where a lot of the power is consumed.

Besides, during installation, the gearbox 26 is required to be connected with the device case 21; then, the motor 28 is connected with the gearbox 26 through a motor support 27. Next, a belt 29 is installed to connect the gearbox 26 and the motor 28. From the above configuration, it can be shown that, those kind of gearboxes have defects such as difficulty in assembling, large power consumption, severe wearing of the turbine and worm after being used for a period of time, generation of clearances which causes failure to reach the required torsional force. Besides, after being used for a period of time, the belt also has to be re-fastened and after the belt becomes worn, a new one has to be installed to maintain normal working conditions.

BRIEF SUMMARY OF THE INVENTION

The objective of the present invention is to provide an assembly and disassembly device for automobile tire with the obvious advantages of energy-savings, reduction of the drive consumption and long service life to overcome the defects in the prior art.

The objective of the present invention can be fulfilled by the following technical solution:

A assembly and disassembly device for automobile tire comprises a device case, an upright disposed on the device case, a tire dismantling tool connected to a cross beam of the upright, a workbench disposed below the tire dismantling tool and located at the device case. The device case is internally provided with a gearbox.

The gearbox is a compound gearbox integrating a gearbox body and a motor. It is internally penetrated by a main shaft which drives a workbench disposed on the device case to move. The motor is provided with a motor gear; the compound gearbox is internally provided with a drive gear; the main shaft is sleeved with a main shaft gear.

The motor gear is in an engaged connection with the drive gear and makes the drive gear move.

The drive gear is in an engaged connection with the main shaft gear and makes the main shaft gear to move.

The main shaft gear drives the main shaft to bring the workbench which is connected with the main shaft to move.

The motor gear is of spiral-tooth structure, in an engaged connection with the drive gear.

Several drive gears are provided. The drive gears are in engaged connections with one another to control the precision of the drive and to adjust the driving force of the drive. Through setting gears of different dimensions to meet the reduced speed reduction requirements, the reduction ratio of the device is 135K, thus meeting the requirements for increasing the torque.

The drive gear engaged with the motor gear has a helical gear at the lower end and a straight gear at the upper end.

The main shaft gear is a straight gear.

The drive gear engaged with the main shaft gear is a straight gear. The drive gear is in an engaged connection with the main shaft gear and through the drive gear, drives the main shaft in connection to move.

As a preferred embodiment, two drive gears are provided, comprising a first drive gear and a second drive gear. The lower end of the first drive gear is a helical gear and the upper end is a straight gear. The second drive gear is a straight gear.

The helical gear at the lower end of the first drive gear is in an engaged connection with the motor gear with a spiral-tooth structure and the motor gear makes the first drive gear to move. The straight gear at the upper end of the first drive gear is in an engaged connection with the second drive gear, and the first drive gear makes the second drive gear move. The second drive gear is in an engaged connection with the main shaft gear and makes the main shaft gear move.

The workbench is sleeved on the main shaft and driven by the main shaft. The workbench is provided with claws for tightening the vehicle tires and a cylinder for driving the claws to open and close.

Compared with the prior art, on one hand, the present invention changes the power consumption of the worm wheel and worm through the good characteristics of the gear change and the high-strength gear, thus greatly prolonging the service life thereof. The power consumed by the gear drive of the gearbox is about 5%, so the motor power transmitted to the workbench is about 95% of the actual energy. The torque tester tests that the torsional force of the 220V 0.35 kw motor transmitted to the workbench is about 1,100 N·m. For the same torsional force output, the power used by the motor is only half of the original power, achieving the energy-saving effect. On the other hand, the motor is integrated with the gearbox, reducing the energy consumption during the belt drive, and thus reducing the difficulty when assembling. The present invention also has the following advantages:

1. Obvious energy-saving effect: the gearbox employs a gear drive, so the consumed power is only 0.1%.

2. Convenient installation: the gearbox is a combined type, so it only needs to connect the gearbox to the case, and extraneous assembly and adjustments are not needed.

3. High sealability: direct drive reduces the noises and parts wear and tear.

4. Convenient inspection: only six external hexagonal bolts are needed to be dismantled in connection with the case.

BRIEF DESCRIPTION OF THE SEVERAL VIEWS OF THE DRAWINGS

In FIG. 1, main shaft 1, upper cover 2, lower cover 3, worm wheel 4, worm 5;

In FIG. 2, case 21, upright 22, tire dismantling tool 23, workbench 24, cylinder 25, gearbox 26, motor support 27, motor 28, belt 29;

In FIG. 3, main shaft 31, upper cover 32, lower cover 33, motor 34, main shaft gear 35, motor gear 36, first drive gear 37, second drive gear 38;

In FIG. 4, case 41, upright 42, tire dismantling tool 43, workbench 44, cylinder 45, combined gearbox 46.

DETAILED DESCRIPTION OF THE INVENTION

The present invention is described in detail with reference to the attached drawings and embodiment.

Embodiment

Figure 1:
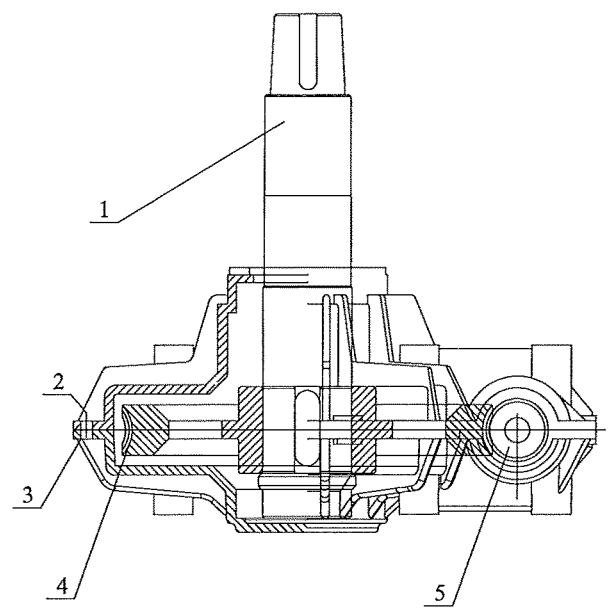
FIG. 1 is a structural view of the gearbox used in the assembly and disassembly device for automobile tire.
Figure 2:
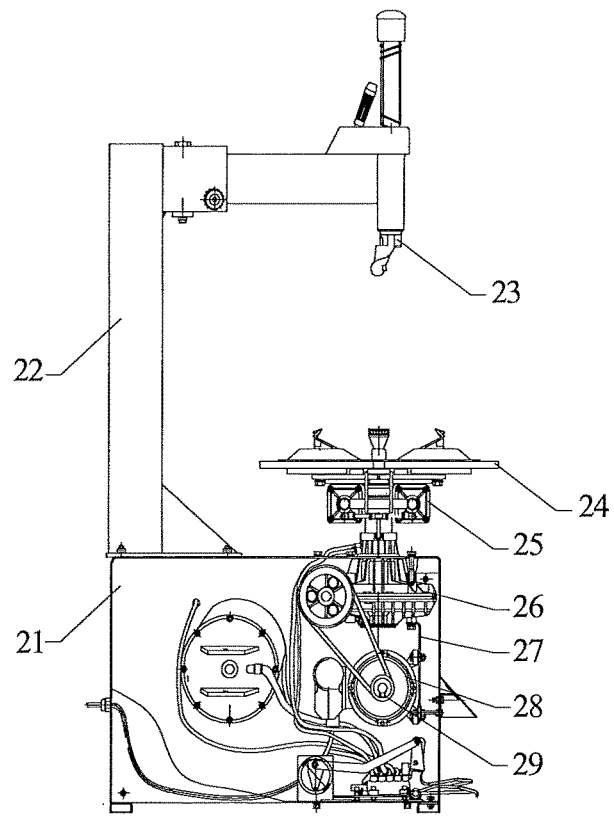
FIG. 2 is a structural view of the assembly and disassembly device for automobile tire.
Figure 3:
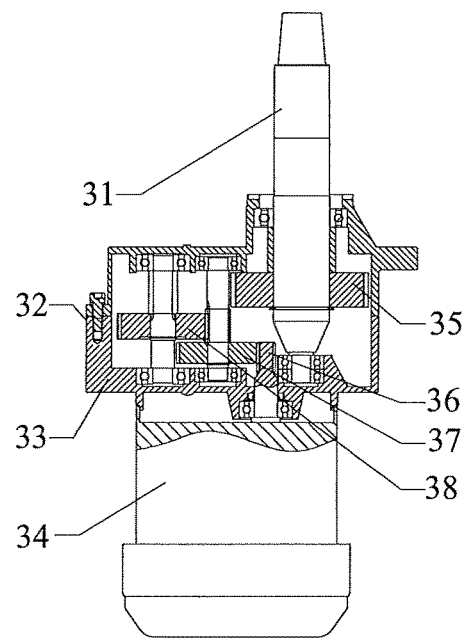
FIG. 3 is a structural view of the combined type gearbox used in the present invention.
Figure 4:
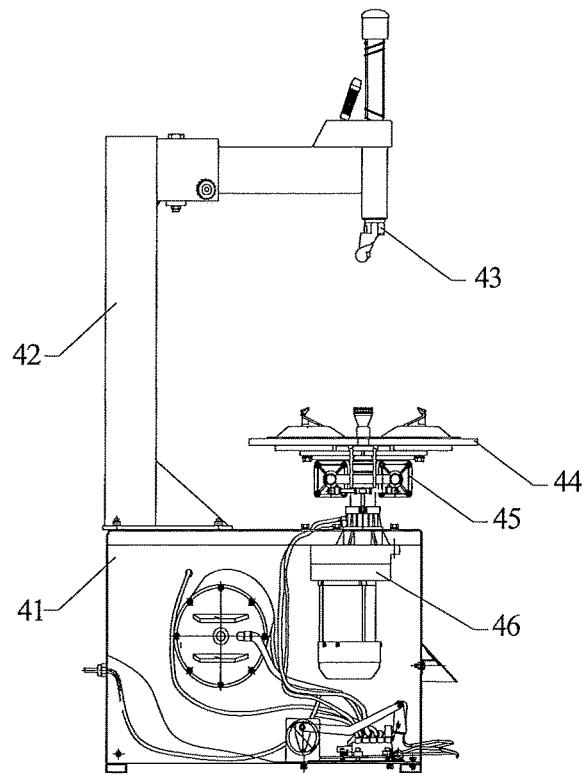
FIG. 4 is a structural view of the present invention.

As shown in FIG. 4, a assembly and disassembly device for automobile tire comprises a device case 41, an upright 42 disposed on the device case 41, a tire dismantling tool 43 connected to a cross beam of the upright 42, and a workbench 44 disposed below the tire dismantling tool 43 and located at the device case 41; the device case 41 is internally provided with a combined type gearbox 46 which integrates the gearbox body and the motor, where the gearbox body consists of an upper cover 32 and a lower cover 33, and the main shaft 31 penetrates the gearbox body. The motor gear 36 is a spiral-toothed structured gear, using two drive gears, where the lower end of the first drive gear 37 is a helical gear, while the upper end is a straight gear; the second drive gear 38 is a straight gear, and the main shaft gear 35 used is also a straight gear. The drive principle is as follows: the lower end of the first drive gear 37 is a helical gear, while the upper end is a straight gear; the motor gear 36 disposed on the motor is a spiral-tooth structured gear, in an engaged connection with the helical gear at the lower end of the first drive gear 37; the straight gear at the upper end of the first drive gear 37 is in an engaged connection with the second drive gear 38; the second drive gear 38 drives the main shaft gear 35 sleeved on the upper part of the main shaft 31 to drive the workbench 44 in connection with the upper part of the main shaft 31 to move.

Through the above design, the motor gear 36 can conveniently be engaged with the drive gear with the straight gear structure. In particular, the straight gear structure is convenient for the drive and has little drive consumption; several drive gears are provided and are mutually engaged and connected. A plurality of drive gears is configured to conveniently control the drive precision and adjust the driving force. Gears of different dimensions or strengths are configured to adjust the value of the delivery force. The reduction ratio of the device is 135K. In this embodiment, the first drive gear 37 and the second drive gar 38 are provided; the second drive gear 38 is in an engaged connection with the main shaft gear 35 sleeved on the main shaft 31, and the drive gear drives the main shaft 31 in connection to make it move.

The workbench 44 used is in a sleeved connection with the main shaft 31 and is driven by the main shaft 31. The workbench 44 is provided with claws for tightening the vehicle tire and a cylinder 45 for driving the claws to open and close. When the present invention is used, the vehicle tire to be dismantled is placed on the workbench 44, fixed by the tire dismantling head 43 and then tightened by the claws of the workbench 44. The main shaft 31 of the combined type gearbox 46 drives the workbench 44 to move so as to complete the separation between the cover tire and the hub of the tire. The present invention employs engaged gears to transmit the power, and changes the energy consumption of the worm wheel and worm by using the good characteristics of the gear change and the high-strength gears. Due to the high-strength gears, the service life of the present invention is greatly prolonged. The motor is integrated with the gearbox, reducing the energy consumption during belt drive, and thus reducing difficulty in assembly.

What is claimed is:

1. An assembly and disassembly device for automobile tire, comprising:
    a device case;
    an upright disposed on the device case, the upright having a cross beam;
    a tire dismantling tool connected to the cross beam; and
    a workbench disposed below the tire dismantling tool, the workbench being located on the device case, and the device case housing a gearbox,
    wherein the gearbox is a compound gearbox integrally formed by a gearbox body and a motor,
    a main shaft penetrates into the gearbox, the main shaft drives the workbench to move,
    the motor has a motor gear, the motor gear is a spiral-tooth structure,
    the compound gearbox has a plurality of drive gears, the plurality of drive gears engages with each other, the plurality of drive gears is configured to control a precision of a drive and adjust a driving force of the drive, and the plurality of drive gears is configured to increase torque,
    the main shaft is sleeved with a main shaft gear,
    the motor gear engages with a first one of the plurality of drive gears and makes the first one of the plurality of drive gears move, a lower end of the first one of the plurality of drive gears engaged with the motor gear is a helical gear, an upper end of the first one of the plurality of drive gears is a straight gear,
    a second one of the plurality of drive gears engages with the main shaft gear and makes the main shaft gear move,
    the main shaft connects the workbench, and the main shaft gear drives the main shaft to bring the workbench to move, and
    an axis of the main shaft is eccentric to an axis of the motor.

2. The assembly and disassembly device for automobile tire according to claim 1, wherein the number of the plurality of drive gears is 2.

3. The assembly and disassembly device for automobile tire according to claim 1, wherein the main shaft gear is a straight gear.

4. The assembly and disassembly device for automobile tire according to claim 1, wherein the second one of the plurality of drive gears engaged with the main shaft gear is a straight gear, the second one of the plurality of drive gears engages with the main shaft gear, and drives the main shaft to move.

5. The assembly and disassembly device for automobile tire according to claim 1, wherein the workbench is sleeved on the main shaft and driven by the main shaft, the workbench has claws for tightening vehicle tires and a cylinder for driving the claws to open and close.

6. The assembly and disassembly device for automobile tire according to claim 1, wherein each of the plurality of drive gears is configured to have different dimensions so that a speed reduction ratio of the assembly and disassembly device is 135K.

\* \* \* \* \*